US006951105B1

(12) United States Patent
Smith

(10) Patent No.: US 6,951,105 B1
(45) Date of Patent: Oct. 4, 2005

(54) ELECTRO-WATER REACTOR STEAM POWERED ELECTRIC GENERATOR SYSTEM

(76) Inventor: Edward J. Smith, 2963 Rowe Rd., Milford, MI (US) 48380

( * ) Notice: Subject to any disclaimer, the term of this patent is extended or adjusted under 35 U.S.C. 154(b) by 0 days.

(21) Appl. No.: 10/828,089

(22) Filed: Apr. 20, 2004

(51) Int. Cl.⁷ ............................................ F01K 13/02
(52) U.S. Cl. .......................................... 60/646; 60/657
(58) Field of Search .................................. 60/646, 657

(56) References Cited

U.S. PATENT DOCUMENTS

| | | | |
|---|---|---|---|
| 2,002,488 A | 12/1934 | Blank | 219/38 |
| 2,245,001 A | 2/1939 | Miller | 60/1 |
| 3,062,553 A * | 11/1962 | Juzi | 277/304 |
| 3,216,199 A * | 11/1965 | Shaw et al. | 60/670 |
| 3,802,189 A | 4/1974 | Jenkins, Jr. | 60/665 |
| 3,896,623 A | 7/1975 | Daniels | 60/665 |
| 3,943,718 A * | 3/1976 | Berry | 60/676 |
| 3,965,675 A | 6/1976 | Martz | 60/39.18 |
| 3,987,632 A | 10/1976 | Pereda | 60/671 |
| 4,059,961 A | 11/1977 | de la Parra | 60/670 |
| 4,081,956 A | 4/1978 | Baker | 60/39.18 |
| 4,096,699 A * | 6/1978 | Zitelli | 60/657 |
| 4,178,763 A | 12/1979 | Stern | 60/667 |
| 4,297,848 A | 11/1981 | Silvestri, Jr. | 60/660 |
| 4,702,081 A | 10/1987 | Vinko | 60/655 |
| 4,841,721 A | 6/1989 | Patton | 60/39.05 |
| 4,976,100 A | 12/1990 | Lee | 60/39.02 |
| 5,170,629 A | 12/1992 | Sindelar | 60/652 |
| 5,347,814 A | 9/1994 | Kemmer | 60/676 |
| 5,375,410 A | 12/1994 | Briesch | 60/39.182 |
| 5,442,908 A | 8/1995 | Briesch | 60/39.182 |
| 5,793,831 A | 8/1998 | Tsiklauri et al. | 379/317 |
| 6,244,033 B1 | 6/2001 | Wylie | 60/39.02 |
| 2004/0050051 A1 | 3/2004 | Raiko | 60/670 |

* cited by examiner

*Primary Examiner*—Hoang Nguyen
(74) *Attorney, Agent, or Firm*—Gifford, Krass, Groh, Sprinkle, Anderson & Citkowski, P.C.

(57) ABSTRACT

An electro-water reactor steam powered electric generator system includes a steam boiler having water and steam chambers, a water intake pipe and a plurality of steam delivery pipes. An electric resistance heater is mounted under and around the boiler having power leads connected to an auxiliary power source. A plurality of independent steam turbines and connected electric generators are joined respectively to the steam delivery pipes. Most of the electric power delivery leads of the generators are adapted to deliver electric power for industrial and residential usage. At least one of the generator power leads is connected to the electric resistance heater elements. A steam return pipe connects each turbine with a condenser which includes a heat exchanger connected to the water intake pipe. Electric pumps and piping circulate water between the condenser and a body of water. An auxiliary electrical power source is connected to the heater elements.

8 Claims, 1 Drawing Sheet

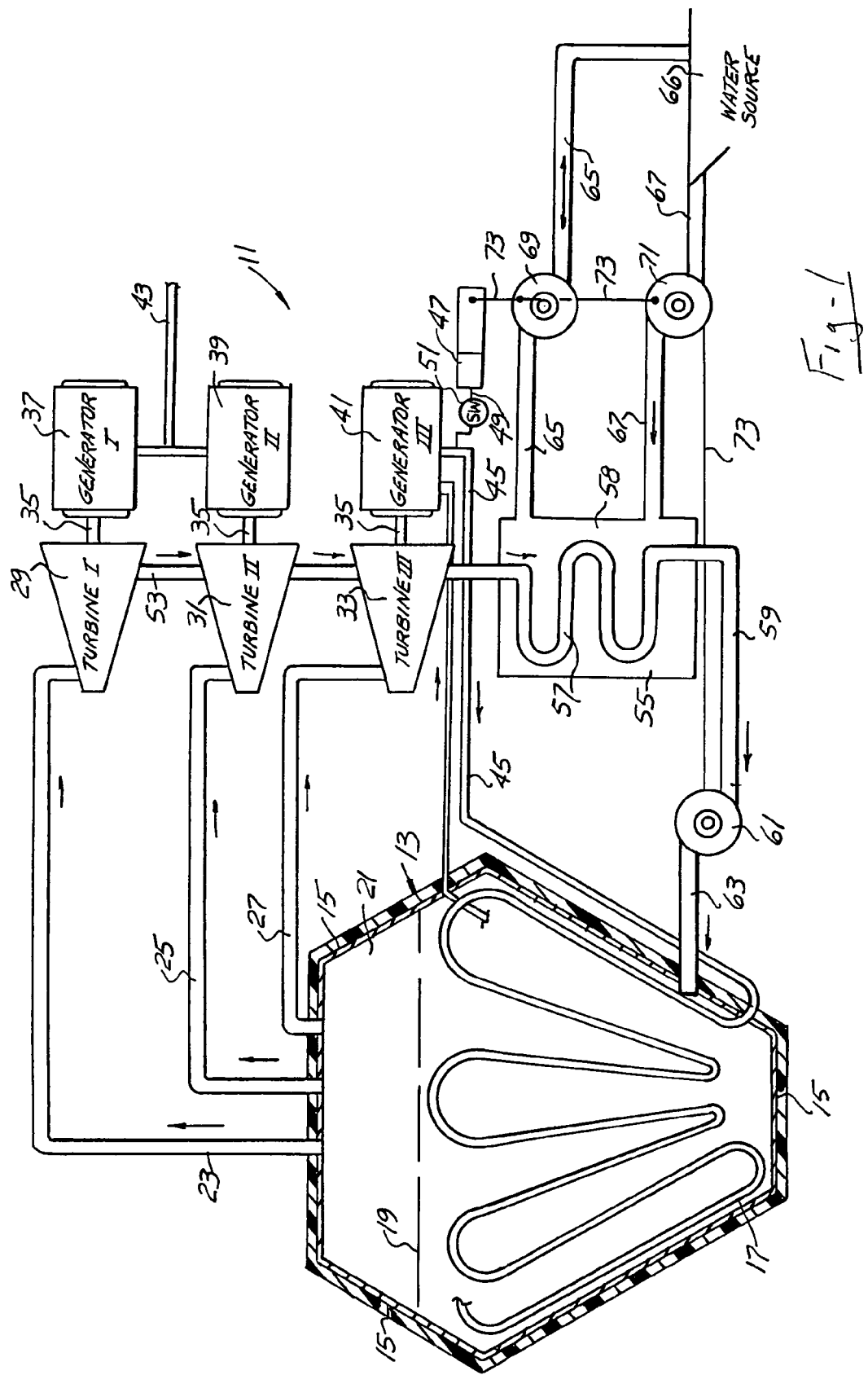

ELECTRO-WATER REACTOR STEAM POWERED ELECTRIC GENERATOR SYSTEM

BACKGROUND OF THE INVENTION

1. Field of the Invention

The present invention relates generally to conventional power plants for the production of steam from a boiler and attendant electrical energy for the operation of turbines and connected electric generators. More specifically, the present invention discloses a multi-steam boiler and electric generator configuration by which a plurality of looped electrical resistance elements are arranged in contact with a steam boiler and by which a portion of the generated electrical power is utilized in heating the electrical resistance elements in the boiler.

2. Description of the Prior Art

In conventional power plants the use of fossil fuels is not only at present costly and ever increasing in price, particularly the oil sources, but the exhausting of the products of combustion into the atmosphere is harmful to the environment and produces a high degree of exhaust pollution. This requires sophisticated and costly equipment for controlling and minimizing such pollution.

Nuclear power is also used to some extent in the production of steam from boilers for operating turbine operated electrical generators. Here there is further danger to the environment and possibilities of pollution and other hazards which have been considered and which are objected to by many people. The problem of disposal of nuclear power wastes and the problems of leakage or accidents is ever present with nuclear powered plants.

U.S. Pat. No. 5,793,831, issued to Tsiklauri et al., teaches a method and apparatus for improving the efficiency and performance of a steam driven power plant. A gas turbine electrical generation system with heat recovery boiler is installed along with a micro-jet high pressure and a low pressure mixer superheater.

U.S. Pat. No. 4,702,081, issued to Vinko, teaches a steam generator connected to a multi-part steam turbine which drives an electric generator and has intermediate superheaters between the turbine parts. It is driven by steam supplied at supercritical pressure by the steam generator. A second electrical generator is driven by a multi-part gas turbine with multiple expansion and intermediate heating of the turbine gases. The heated turbine gases issuing from the gas turbine are fed to heating surfaces in the steam generator and to a preheater, connected to the latter, for the condensate flowing in the steam circuit back to the steam boiler. The turbine gas heaters integrated with the intermediate superheaters in the steam circuit are formed in a boiler fired with fossil fuels.

U.S. Pat. No. 2,002,488, issued to Blank, teaches an electrically controlled steam engine for use as a substitute for locomotion power for a railway train. Steam as a power for locomotion is produced by electricity derived from a desired source and produced by the use of electric coils for a supply of heat, and heat from internal combustion engines, the latter operating as an agent for actuating certain electric generators.

U.S. Pat. No. 6,244,033, issued to Wylie, disclosing a process for a steam turbine-generator system which includes a boiler and a train of steam turbines and gas turbine generator system. Exhaust gas from the gas turbine superheats the high pressure steam produced by the boiler in the steam generator system and reheats a steam side stream extracted at an intermediate point on the steam turbine train in the stream generator system after which the reheated steam side steam is fed back into the steam turbine train downstream of the extraction point. The exhaust gas preheats a steam condensate stream formed by condensing the exhaust stream from the downstream steam outlet on the steam turbine train after which the preheated condensate is recycled back to the boiler. The gas turbine exhaust gas superheats the high pressure steam and reheats the steam side stream before it preheats the steam condensate stream.

SUMMARY OF THE INVENTION

In accordance with the present invention, water is heated in a large boiler just as in conventional fossil fuel electric power plants, but instead of using fossil fuels including coal and oil or nuclear power, water is heated by electrical power.

It is therefore a primary object of the present invention to provide a substitute power source for power plants and particularly plants designed for the development of electrical power for city use and industrial or commercial use and wherein electrical power is employed operating electric resistance heater elements applied to a boiler for the production of steam. It is a further object to provide the plurality of steam operated turbines and connected electric generators and wherein a portion of the electrical power generated may be used for augmenting or providing the electrical power for the heating elements of the boiler.

It is a further object to provide a secondary auxiliary electrical power source for the initial energizing of the electric resistant elements of the boiler and wherein after sufficient operation of the electrical generation system, some of the generated electrical power can be used to augment said auxiliary power source and to energize the electric resistance heating elements of the boiler.

A further object of the present invention is to provide an electric resistance energized heating source for a steam boiler and wherein environmental benefits are contemplated in eliminating pollution from fossil fuels and in the elimination of nuclear power and the suspected hazards involved in its use.

A further object of the present invention is to provide a steam boiler having a steam chamber and a series of steam delivery pipes together with a series of electrical resistance heating elements which are arranged upon and around the boiler and wherein there are provided a plurality of turbines connected respectively to the individual steam delivery pipes and wherein each turbine operates an electrical power generator and wherein the outputs of the electrical power generators are used primarily for the delivery of electrical power for commercial and residential use, and wherein further, the output of at least one of the turbine powered electrical generators is employed for providing electrical energy directed to the heating elements for the boiler. A supplemental electrical power source independent of the boiler provides such electrical power as may be needed to energize the boiler electric resistance heating elements.

These and other objects will be seen from the following specification and claims in conjunction with the appended drawing.

BRIEF DESCRIPTION OF THE DRAWING

Reference will now be made to the attached drawing, when read in combination with the following detailed description, wherein like reference numerals refer to like parts throughout the several views, and in which:

FIG. 1 is a schematic diagram of the present electro-water reactor steam powered electric generator system according to the present invention and which illustrates in particular the arrangement of a supplemental electric generator in operative communication with a plurality of resistance coils embedded within the steam generating boiler.

It is also understood that the above drawing illustrates merely a preferred embodiment of the invention, and that other embodiments are contemplated within the scope of the invention as subsequently described and claimed.

DETAILED DESCRIPTION OF THE PREFERRED EMBODIMENTS

Referring now to FIG. 1 of the drawing, an electro-water reactor is illustrated at 11 according to a preferred embodiment of the present invention and is essentially a steam powered electric generator system, such as is used in a power plant for providing electrical power to cities, for residential or industrial usage. The present electro-water reactor includes a conventional type of steam boiler 13 with insulated metallic walls 15.

A series of interconnected and looped electric resistance elements 17 are arranged in communication with the steam boiler 13 and, in a preferred embodiment, are arranged in extending fashion within an interior of the boiler and in order to most effectively conduct heat to the superheated interior. Appropriate measures are taken to protect the structural and chemical integrity of the coils when extending in the humid and pressurized confines of the boiler interior. In a further preferred variant, the electric resistance elements are applied contiguous with exterior side surface and bottom surface locations of the boiler throughout a 360 degree exterior circumference thereof and normally extend to approximately the water level 19 defining the water chamber within the boiler.

The upper portion of the boiler includes steam chamber 21 and connected thereto are a series of steam delivery pipes 23, 25 and 27 adapted for delivering steam from the boiler to a series of steam turbines 29, 31 and 33 respectively. Each of the respective turbines 29, 31 and 33 shown in the drawing have output shafts 35 connected to respective electric generators 37, 39 and 41 indicated also as generators I, II and III. Each of the generators 37, 39 and 41 exhibit a power delivery or output lead shown at 43 with respect to generators I and II shown at 45 with respect to generator III.

The power output leads 43 from the generators I and II are adapted for delivery of electrical power to cities for commercial and residential usage and, accordingly, turbine 33 and associated generator 41 may be smaller in capacity than the turbine and generator arrangements 29 & 37 and 31 & 39.

According to the invention, the power delivery lead 45 is adapted to deliver electricity to the series of interconnected electric resistance heaters 17, in turn providing heat energy for heating the water below level 19 in the steam boiler 13, as well as pressurizing steam in chamber 21.

A secondary (or auxiliary) electrical power source is generally designated at 47, which may be a portable or other diesel or motor operated generator having an output lead 49 which is connected into power lead 45 for initially delivering electrical power to the electric resistance heaters. This power is supplemented by the electrical power delivered to lead 45 from generator III 41 after the system is in operation.

A normally closed overload type of switch is schematically shown at 51 connected into the lead 49 by which power from a secondary power source may under some conditions be disconnected, should generator III 41 provide sufficient electrical energy for the operation of the series of electric resistance heaters 17. It is contemplated, however, that in more situations there will be some secondary electrical power made available and provided by the auxiliary power source 47 directed to the heaters 17.

Steam return pipe 53 extends between turbines 29, 31 and 33 for delivering excess or wasted or unused steam to a condenser, schematically shown at 55, and through the heat exchange coils 57 immersed in a water chamber 58 therein. The condensed steam is returned as water through a water feed pipe 59 and, through the action of an electric pump 61, returns water to the boiler 13 through a water pipe 63 which is in communication with the water chamber within the boiler 13.

The heated water from the condenser 55 may be circulated through an outlet pipe 65 and electric pump 69 back to a cold water source such as shown at 66. This can be any body of water such as a reservoir, a river, a lake or an ocean. Cold water intake pipe 67 connected to such water source, through the electric pump 71 delivers water through the water intake pipe 67 back into the condenser body 55 for further circulation therethrough.

An electric power lead 73 is shown in the diagram of the drawing which interconnects the secondary or auxiliary power source 47 with the respective pumps 69, 71 and 61 shown in the drawings. It is contemplated as an equivalent construction that the power for the operation of the respective pumps could be directly connected to the output electric delivery lead 45 from generator m.

One of the important benefits of the present system is that it will help in many ways to save the environment and our natural resources which are presently endangered by the use of fossil fuels and by nuclear power.

The effective use of the present electro-water reactor would replace to a great extent electrical power produced from such other sources and tend to provide a better environment.

Having described my invention, other and additional preferred embodiments will become apparent to those skilled in the art to which it pertains, and without deviating from the scope of the appended claims.

I claim:

1. An electro-power reactor steam powered electric generator system comprising:
    an insulated boiler having a water chamber and a steam chamber, a water intake pipe connecting to said water chamber, a plurality of steam outlet pipes extending from said steam chamber;
    an electric heater including a series of connected electric resistance heater elements mounted in heat conducting fashion relative to at least one of said water chamber and said steam chamber;
    power leads extending to said heater elements exteriorly of said boiler;
    an auxiliary electrical power source connected to said heater element power leads for initially energizing said heater elements;
    a plurality of steam turbines connected to said steam outlet pipes, respectively;
    a plurality of electric generators connected respectively to and driven by each of said turbines;
    an electric power delivery lead connected to each of said generators;
    at least one of said electric power delivery leads being adapted to deliver electrical power for industrial and residential usage; and at least one additional of said generator electric power leads being connected to said heater element power leads for supplementing an auxiliary electric power source and for energizing said heater elements.

2. The electro-power reactor system as described in claim 1, said heater elements overlying and being substantially coextensive with said boiler water chamber and about a 360 degree circumference thereof.

3. The electro-power reactor system as described in claim 1, said heater elements extending within an interior of said boiler and beneath a water level separating said water chamber from said steam chamber.

4. The electro-power reactor system as described in claim 1, further comprising:
   a condenser having a water chamber and a heat exchanger therein;
   a steam return pipe connecting each of said turbines with said condenser and exhausting steam to said heat exchanger;
   a water feed pipe interconnecting said heat exchanger and a water intake pipe; and
   an electric pump located in said water feed pipe and connected to said auxiliary electrical power source.

5. The electro-power reactor system as described in claim 1, a normally closed overload cutoff switch being interposed between said auxiliary power source and said power delivery output lead associated with said electric heater elements.

6. The electro-power reactor system as described in claim 4, further comprising water output and cold water intake pipes respectively interconnecting said condenser water chamber with a body of water, an electric pump on each of said latter output and intake pipes being connected to said auxiliary electrical power source.

7. The electro-power reactor system as described in claim 1, a selected turbine and associated generator, from which extends said power leads connected to said heater elements, being smaller and of less capacity than said other turbines and generators.

8. An electro-power reactor steam powered electric generator system comprising:
   a boiler having a water chamber and a steam chamber, a water intake pipe connecting to said water chamber, a plurality of steam outlet pipes extending from said steam chamber;
   a series of connected electric resistance heater elements mounted within an interior of said boiler and in heat conducting fashion relative to said water chamber;
   power leads extending to said heater elements exteriorly of said boiler;
   an auxiliary electrical power source connected to said heater element power leads for initially energizing said heater elements;
   a plurality of first, second and third steam turbines connected to said steam outlet pipes, respectively;
   a plurality of first, second and third electric generators connected respectively to and driven by each of said turbines;
   an electric power delivery lead connected to each of said generators;
   a first of said electric power delivery leads, associated with said first and second generators, being adapted to deliver electrical power for industrial and residential usage; and
   a second of said generator electric power leads, associated with said third generator, being connected to said heater element power lead for supplementing an auxiliary electric power source and for energizing said heater elements.

* * * * *